United States Patent [19]

Bishop

[11] Patent Number: 5,390,861
[45] Date of Patent: Feb. 21, 1995

[54] METHOD AND APPARATUS FOR REDUCING RUBBER TIRE MATERIAL TO A PULVERULENT FORM

[75] Inventor: Raymond T. Bishop, Houston, Tex.

[73] Assignee: National Rubber Recycling, Inc., San Antonio, Tex.

[21] Appl. No.: 94,506

[22] Filed: Jul. 20, 1993

[51] Int. Cl.⁶ .............................................. B02C 7/12
[52] U.S. Cl. ...................................... 241/24; 241/102; 241/260; 241/289; 241/DIG. 31
[58] Field of Search .................... 241/24, 66, 67, 102, 241/260, 261.1, 289, 290, DIG. 31, 285.2, 285.3

[56] References Cited

U.S. PATENT DOCUMENTS

| | | | |
|---|---|---|---|
| 1,721,962 | 7/1929 | Lewis | 241/DIG. 31 X |
| 3,044,720 | 7/1962 | Bridgewater | 241/102 X |
| 3,718,284 | 2/1973 | Richardson | 241/DIG. 31 X |
| 3,788,567 | 1/1974 | Yamada | 241/261.1 X |
| 4,422,581 | 12/1983 | Chryst | 241/DIG. 31 X |
| 4,641,791 | 2/1987 | Cermanov et al. | 241/66 |
| 5,289,981 | 3/1994 | Kamiwano et al. | 241/261.1 |

*Primary Examiner*—Timothy V. Eley
*Attorney, Agent, or Firm*—James L. Jackson

[57] ABSTRACT

A method and apparatus for processing discarded rubber tires and rubber tire material to reduce the same to a pulverulent form of sufficient quality fiber the manufacture of other articles. Principally the rubber tire is subjected to repeated compression against the metal strand component of the tires thus causing the metal stranding to cut into or chew the rubber into a pulverulent form. During the processing of the rubber tire material it is broken down to the point that its constituents such as metal fibers and polymer fibers are separated therefrom. The pulverized rubber, together with its separated constituents may then be classified and the constituents separated for further use. The rubber tire processing apparatus incorporates an external housing structure and a rubber processing drum that is rotatable therein. The drum and the housing define interrelated wedging surfaces that cause the rubber tire material to be continuously compressed and worked against itself and worked against the metal stranding of the tires to develop severe wedging, tearing and shearing forces that rapidly break it down to a pulverulent form. Both the housing and drum incorporate replaceable wedging and wearing structures that are preferably composed of very hard, wear resistant material that provide the rubber processing machine with an extensive service life.

15 Claims, 4 Drawing Sheets

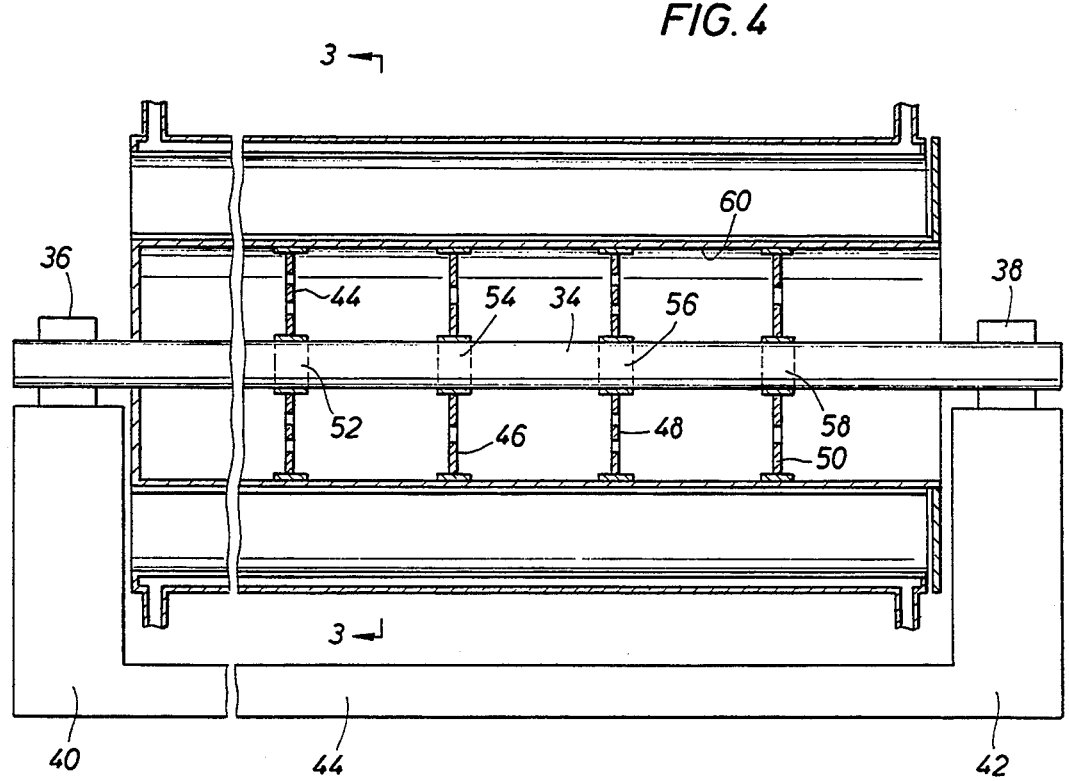
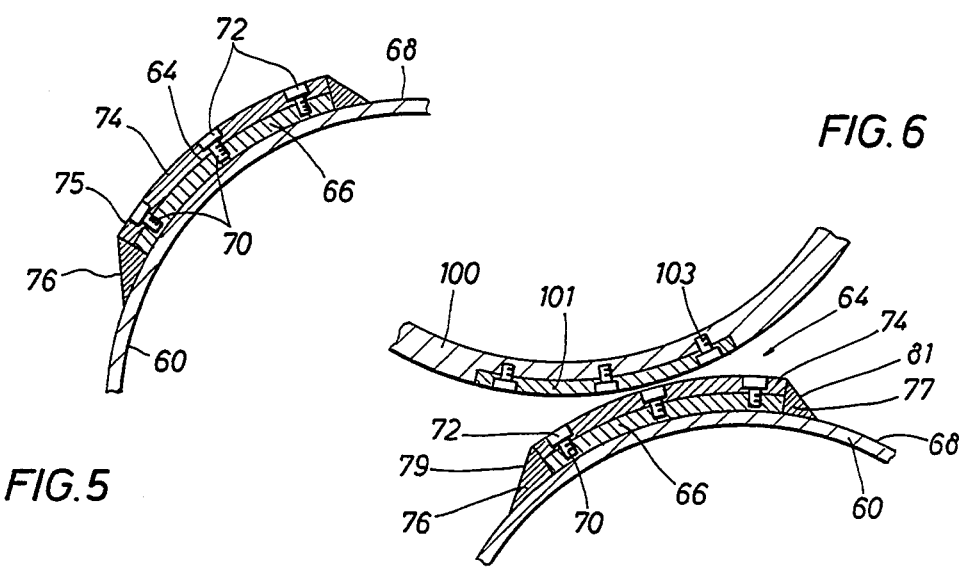

METHOD AND APPARATUS FOR REDUCING RUBBER TIRE MATERIAL TO A PULVERULENT FORM

FIELD OF THE INVENTION

This invention relates generally to a method and apparatus for processing discarded rubber tires and rubber tire material to yield a pulverulent rubber byproduct which can be efficiently used in the manufacture of other articles or which can be utilized as fuel such as for the generation of steam and electrical energy. More particularly, the present invention concerns a method and apparatus that provides for an input of whole rubber tires such as automobile tires, truck tires and the like or shreds and chunks thereof and subjecting the same to mechanical compression and internal stress and working it against itself and against the steel strand component of the tires so as to break down the rubber tire material into its various constituents and to reduce the tire rubber itself to a finely comminuted pulverulent or powder-like form that may be effectively utilized for the manufacture of other articles or which may serve as an efficient fuel for generation of heat in steam and electrical processing plants.

BACKGROUND OF THE INVENTION

The term "rubber", as used herein is intended to encompass all types of natural and synthetic rubber and various resilient materials that are composed of polymers, polymer components with other materials and polymer composites with material or synthetic rubber.

Tires for automotive vehicles are typically in the form of composites including layers of synthetic rubber, herein referred to as rubber, and layers of fabric and metal belting which provides the tires with structural integrity sufficient to significantly extend the service life thereof. The typical tire for passenger vehicles has an average weight in the order of twenty pounds including one pound of fabric belting, four pounds of steel belting and the remaining fifteen pounds being composed of synthetic rubber. The range of weight of typical passenger vehicle tires is in the order of from about twelve pounds to about twenty-six pounds. Vehicle tires are expendable items typically having a service life of from 30,000 miles to 60,000 miles. It is not unusual for a passenger automobile to be provided with from three to five sets of replacement tires during its service life.

In the past, when automotive tires have been removed and discarded they have been disposed of by burning or by depositing them in landfills. Obviously, synthetic rubber and the other constituents of vehicle tires do not break down in landfills even after many years. Thus, landfills which have accepted rubber tires for disposal have quickly become filled to capacity. Also, the increased costs of landfill type disposed facilities, and the various environmental problems that arise from landfill disposal operating have caused landfill disposal of this to be unsatisfactory and in many cases prohibited.

Another method for disposing of discarded vehicle tires is the practice of segregating them from conventional refuse and transporting them to a surface location for storage. The typical purpose of surface storage is to await the development of a process and apparatus for reclaiming the rubber and other materials from the tires so that the byproducts may be utilized in the manufacture of other articles or utilized as fuel such as for firing energy production plants. It is not unusual at the present time for a surface type tire storage facility to contain in the order from in excess of one million tires. These surface type storage facilities have a number of disadvantages that make them impractical. The tires in these facilities typically contain small volumes of rain water which becomes breeding areas for mosquitoes and other insects. Further, this retained water often becomes stagnant and can provide a developing environment for communicable diseases. At times these large volumes of stored discarded tires have become ignited by spontaneous combustion or by other means and have developed a fire and smoke hazard that is extremely difficult and expensive to combat. In general therefore, outdoor storage facilities for discarded tires presents a wide variety of problems that renders them unsuitable to the point that many government agencies have established deadlines for elimination of such tire storage areas.

More recently various companies, typically with governmental support, have initiated a number of differing processes for destruction of the fires and for reclamation of the byproducts thereof. Typically the tires are ground, shredded or chopped to a form where the rubber chunks or particles have a size range of about nine square inches. When tires are shredded the rubber chunks typically random in sizes from one square inch or greater. These chunks of rubber tire material typically incorporate synthetic rubber, steel and a polymer fabric. The chunk form rubber tire material is then transported via conveyer or by any other suitable means to a surface based storage facility. The resulting chopped, shredded or ground rubber tire material has been treated in a number of ways to render it to a satisfactory form for reuse. For example, processes have been developed for microwave revulcanization of the material and for its destruction and rendering to an energy form by means of pyrolysis.

Because the steel fibers and polymer fabric materials typically remain with the rubber shreds, these constituents are often detrimental to effective reclamation of the rubber for use in the manufacture of other articles. It is desirable therefore to provide a method and apparatus for reducing rubber tire material to a pulverulent form and which prepares the material for efficient separation of tire constituents such as steel fibers and polymer fabric from the rubber.

During processing of rubber tire material especially for purposes of reclaiming the rubber for use in the manufacture of other articles, heat build up in the rubber tire material can become detrimental to future use of the rubber. In the event the rubber tire material becomes excessively hot, which very easily results from tire crumbing operations, the heat build up in the material can cause a molecular structural change in the rubber, thus rendering it unsuitable for use in article manufacturing processes. In this case, the resulting crumb rubber may be suitable only for use as fuel such as for energy producing facilities. Typically however the shredded crumb rubber material must be transported to a facility for energy production from one of the many tire storage facilities that have been established. The transportation costs of the reclaimed rubber tire constituents is often detrimental to utilization of the material even for energy production. It is desirable therefore to provide a method and apparatus for reclaiming rubber and other materials from used tires which does not cause undesirable heat induced molecular change of the rubber to the point that it becomes unsuitable for product manufacturing processes. It is also desirable to provide a method and apparatus for processing tires, which can be located at or near a manufacturing facility to thus minimize transportation and manufacturing costs.

SUMMARY OF THE INVENTION

It is a principle feature of the present invention to provide a novel method and apparatus for reducing rubber tires and rubber tire material to a pulverulent form that is suitable for use in the manufacture of rubber articles and for use as fuel, especially for energy producing processes.

It is another feature of this invention to provide a novel method and apparatus for reclamation of rubber tire materials which achieves mechanical separation of the various constituents thereof and enables effective classification of the materials for desirable reclamation or disposal.

It is an even further feature of this invention to provide a novel method and apparatus for reducing rubber tires and rubber tire materials to a pulverulent form which method and apparatus accomplishes mechanical compression, tearing, shredding and shearing of the rubber tire material by continuously working it upon itself and working it against the metal constituent of the tires, thus causing it to be broken down to a powder-like or granulated pulverulent form while maintaining the induced heat of processing below a level that causes undesired molecular structural changes that would otherwise inhibit its subsequent use in manufacturing processes.

It is also a feature of this invention to provide a novel method and apparatus for recovery of pulverulent rubber from vehicle tires which employs the metal, typically steel of the tires to work the rubber material upon itself and accomplish pulverization of the rubber without changing its molecular characteristics.

Briefly the various objects and features of the present invention are realized through the provision of a method whereby whole rubber tires and comminuted or shredded rubber tire materials such as those in the form of small chunks are continually worked upon itself and subjected to mechanical compression, tearing, shredding and shearing forces which cause the rubber tire material to be rapidly pulverized to release the various components thereof from one another. The rubber tire material is continually folded or worked upon itself for generation of internal stresses that break down or disintegrate the rubber tire material and causes its separation from its various constituents. The synthetic rubber, steel fibers and polymer strands are all broken down to a pulverulent form that is suitable for efficient classification and for effective use of each of the constituents in the manufacture of other articles or for efficient profitable salvage. The process of breaking down the rubber tire materials also renders the various constituents of the rubber tire materials to a form that enables efficient classification or separation of the materials so that they may be separately recovered and disposed of as scrap or provided for other manufacturing processes.

The method of the present invention is accomplished by providing a pair of relatively longitudinally movable surfaces defining a receptacle or processing chamber therebetween for movement of rubber tire material therethrough. The receptacle or processing chamber for the rubber tire material is of generally cylindrical configuration, defining an inlet opening at one end into which tires and tire rubber is fed and a discharge opening at the opposite end from which pulverulent rubber is discharged. Internally the apparatus defines two relatively rotatable generally cylindrical concentrically oriented drum-like elements which cooperatively define between them a plurality of rubber processing chambers. Each of these chambers, when considered transversely of the apparatus, defines a relatively large processing area within which the rubber material is continuously worked upon itself and worked upon the steel constituent of the tire material to cause it to become broken down to a pulverulent form. Each of the processing chambers for the rubber tire material is of tapered cross-sectional configuration so that its wall surfaces are oriented in wedge-like fashion. Portions of the relatively rotatable walls of the processing chambers move into very close proximity at specific portions of the rotational cycle of the machine. The chamber walls subject the rubber tire material to increasing compression as it is forced to move toward the regions of close proximity within the processing chambers thus subjecting the tire rubber, shearing and tearing by working it against the steel or other metal strands. The internal configuration of the processing chambers are defined in part by rather abrupt, inclined wedging surfaces which cause the rubber tire material to be wedged sufficiently upon relative rotational movement of the chamber surfaces so as to impart severe compression, tearing and shearing forces to the rubber tire material as it is worked against the steel strand material of the tires so that it readily breaks down to a pulverulent form. When this occurs the other constituents of the rubber tire material such as steel and polymer strands become separated from the rubber and for the most pan are discharged from the processing machine separately from the pulverulent rubber.

In the preferred embodiment the relatively rotatably movable surfaces are defined by an elongate housing structure having an elongate drum concentric and relatively rotatable therewith. The housing structure is preferably stationary while the internal rubber processing drum is rotatable within the housing. The housing is also capable of opening in clamshell-like fashion so that any excessive mechanical forces that might be developed within the processing chambers will cause force induced opening of the housing and will not cause destruction of the components of the housing or drum. If desired, both the housing and drum may be rotatably mounted for counter rotation or in the alternative the drum may be fixed while the housing may rotate about the drum. The structural components of the housing and drum cooperate to define a plurality of tire rubber processing chambers through which the rubber tire material moved during its processing. These processing chambers are of elongate configuration and are generally horizontally oriented and disposed in parallel relation with a horizontal axis about which the drum rotates. As briefly discussed above, the processing chambers have large inlet openings at one end into which rubber tire material including whole vehicle tires is fed and have discharge openings at the opposite ends to permit discharge of pulverulent material after it has been reduced to a powder-like pulverulent character. The chamber walls of the processing chambers are arranged in converging relation so that transversely, the processing chambers progress from a relatively large dimension at one side thereof, to a very small dimension at the opposite side thereof. One wall of each processing chamber defines a rather abrupt wedging surface which is inclined with respect to the opposite relatively rotatably movable surface at an angle of between 40° and 80° and preferably at an angle of about 60°. As the inclined wedging surface and its opposed surface move rotatably relative to one another any rubber tire material present at the wedging surface wedged tightly between converging surfaces of the processing chamber and thus will be subjected to severe compression, tearing, shredding and shearing forces by being worked upon itself and being worked against the steel constituent of the tire material thus causing the rubber tire material to be quickly broken down to a powder-like, pulverulent form. The steel and fabric strands of tire material will become separated so that most of it can be discharged separately from the rubber. Any smaller metal particles can then be separated from the pulverulent rubber by magnetic processing.

To minimize the heat that has developed during processing of the rubber tire material the elongate housing or drum or both will define a plurality of elongate coolant passages through which any suitable liquid or gaseous coolant material such as water or air is caused to flow. The flowing coolant material will remove heat that is developed in the rubber tire material by transferring heat from the wall surfaces of the processing chambers so as to maintain the rubber tire material well below the temperature where heat induced molecular change of the rubber might occur. Thus, the resulting rubber particulate is suitable for use in the manufacture of other articles. The other fibrous materials of the tires, such as steel and polymer, are physically separated from the rubber during processing and are also subject to subsequent classification for efficient reclamation or disposal.

BRIEF DESCRIPTION OF THE DRAWINGS

The present invention has additional objects, features and advantages which will become more clearly apparent in connection with the following detailed description of a preferred embodiment, taken in conjunction with the appended drawings in which:

FIG. 4 is an elongate sectional view taken along line 4—4 of FIG. 3;

FIG. 5 is a fragmentary sectional view of a portion of the rotatable rubber working drum and specifically illustrating the detailed structure of one of the tire working elements thereof;

FIG. 6 is a fragmentary sectional view similar to FIG. 5 and illustrating an embodiment showing replaceable wear plates for the curved wedge plates thereof;

DETAILED DESCRIPTION OF PREFERRED EMBODIMENT

Figure 1:
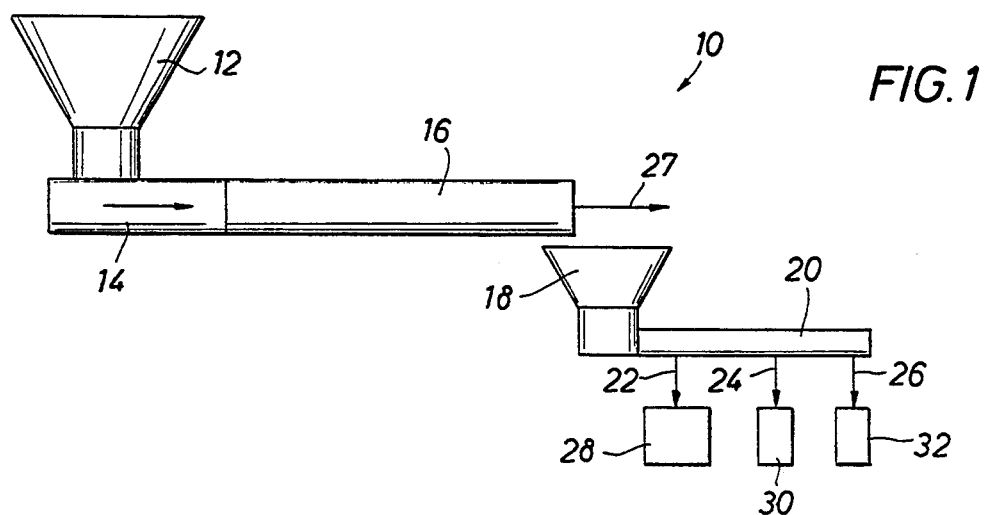
FIG. 1 is a graphical representation of a facility for processing rubber tires and rubber tire material to a pulverulent form and for classifying the resulting particulate.

Referring now to the drawings and first to FIG. 1 apparatus for processing rubber tires and rubber tire materials is shown generally at 10 and includes a receiver 12 such as a hopper into which whole rubber tires or rubber tire materials are deposited. The hopper 12 provides a suitable reservoir for containing a large volume of rubber tires and rubber tire materials and provides for gravity or mechanically induced descent of the rubber materials to an auger type conveyer or other suitable conveyor 14 that moves the rubber tire materials linearly in the direction shown by the flow arrow. The conveyer 14 is operative to not only convey the materials in linear fashion but to provide a conveying force that forcefully feeds the rubber tire materials into a processing machine 16 for breaking down the rubber material to a pulverulent form and for separating the rubber from other constituents of the fires, including steel or other metals, fabric composed of material or synthetic materials, etc. The conveyer 14 and the rubber processing machine 16 are shown in greater detail in FIGS. 2 and 3. After the rubber tire material has been reduced to a pulverulent form it is discharged from the processing machine 16 at discharge point 27 and is conducted typically by gravity or by a vacuum induced collector and conveyor to a receiver 18 which may be in the form of a receiving hopper. From the hopper 18 the pulverulent rubber material and its metal and fabric constituents are conducted via a conveyer 20 which conducts it to a suitable receiver or receivers for further handling or disposal. As shown in FIG. 1 the conveyer 20 also is capable of accomplishing classification of the pulverulent materials being discharged from the machine 16 so that the various constituents of the rubber tire material such as rubber, steel and fabric are then conducted via conveyers 22, 24 and 26 to appropriate receivers 28, 30 and 32. The reviver 28 may be provided to receive pulverulent rubber material while receivers 30 and 32 may be provided respectively for receiving steel strand material and particulate and for receiving polymer fabric material and particulate so that these constituents may be reclaimed for further use or for separate disposal.

Figure 2:
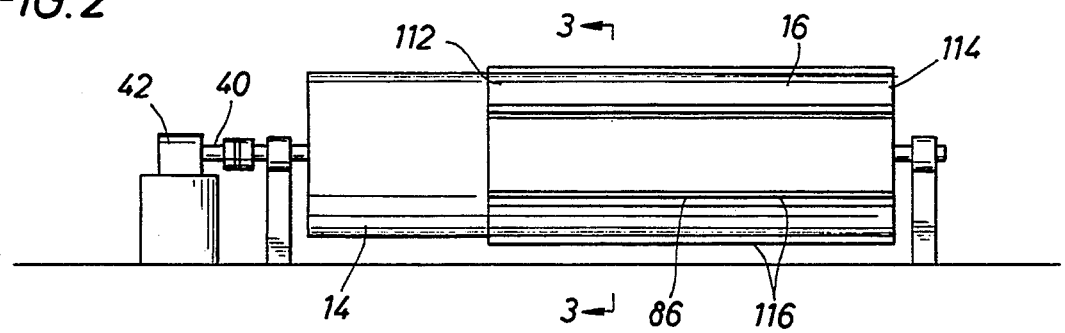
FIG. 2 is a side elevational view of a machine for processing rubber tires and rubber tire materials to yield a pulverulent tire material output.
Figure 3:
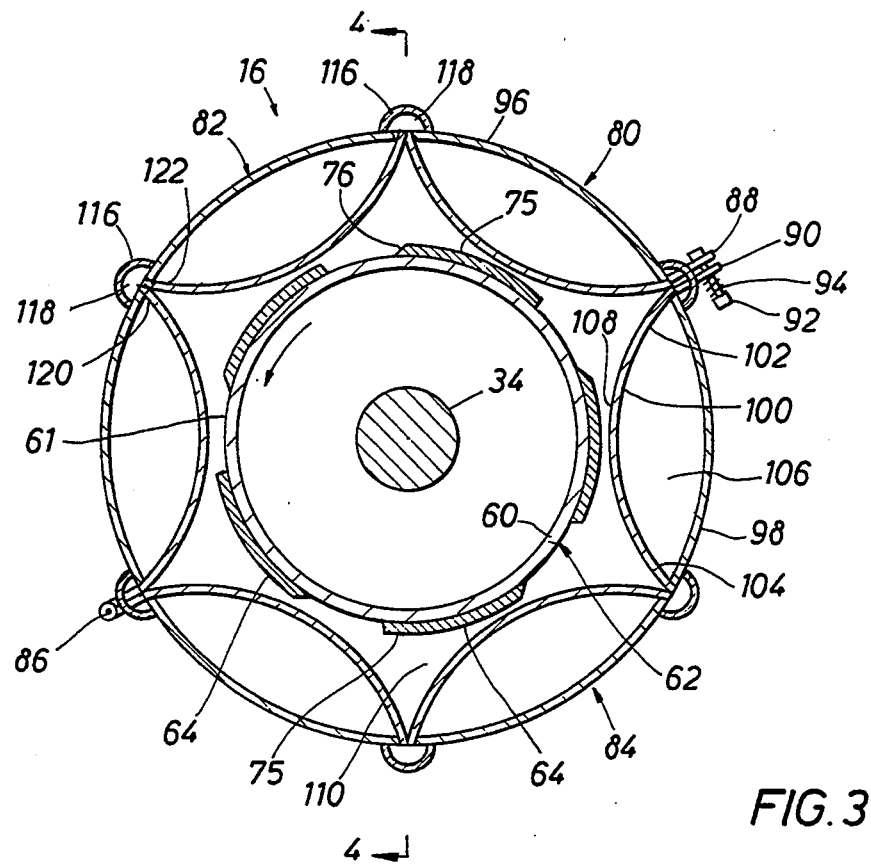
FIG. 3 is a sectional view taken along line 3—3 of FIG. 2 and showing the cross-sectional view of the preferred embodiment of this invention.

The apparatus for feeding or conveying rubber tires or rubber tire materials to the tire pulverizing machine 16 and the pulverizing machine itself are illustrated in greater detail in FIGS. 2, 3 and 4. As shown particularly in FIGS. 3 and 4, the tire pulverizing machine 16 includes a centrally located drive shaft 34 which is journaled for rotation about a generally horizontally oriented axis by means of suitable bearings 36 and 38, the bearings being supported by structural members 40 and 42 that are in turn supported by any suitable foundation 44. The foundation 44 if desired, may be the earth or a support floor such as in the case of a permanent installation or in the alternative, may conveniently take the form of a structural support skid which provides a portable mounting base for the rubber pulverizing machine 5 and perhaps also the other material handling components of the rubber processing system such as shown in FIG. 1. The drive shaft 34 is coupled in driving relation with any suitable rotary drive mechanism such as the output drive shaft of an electric motor driven drive gear mechanism which imparts a rather slow rpm ratio to the drive shaft 34. For example, it is expected that the drive shaft 34 will be rotated in the range of from about two rpm to about twelve rpm or more preferably in the range of about five rpm. Typically, the drive shaft 34 will be composed of solid steel and will be in the order of nine inches in diameter. A plurality of transverse drive elements such as shown at 44, 46-48 and 50 are coupled by suitable drive connectors 52, 54, 56 and 58 to the drive shaft 34. The drive connectors 44-50 may be composed of plate metal or in the alternative, may be defined by a rigid framework of structural members. The function of these drive connectors is to establish driving relation and effective force transmission from the drive shaft 34 to a generally cylindrical outer wall 60 of a generally cylindrical drum-like member shown generally at 62. This drum-like member is also referred to herein as a rubber working drum because it provides the motive force for breaking down the rubber tires and rubber tire materials to a pulverulent form and for physically separating other vehicle tire constituents from the rubber. If the drive connectors 44-50 are composed of plate material they may be defined by imperforate plate material or, in the alternative, may be defined by plates having perforations therein especially under circumstances where liquid material may be caused to flow along the length of the drum for purposes of heat dissipation. The drive connectors may be coupled by welding, bolting, or by any other suitable means to the cylindrical wall structure 60 of the drum 62.

As shown in FIGS. 5 and 6, externally of the cylindrical wall 60 of the drum 62 are mounted a plurality of wedging pads shown generally at 64 which are typically defined by a mounting plate 66 which is welded or bolted to the external cylindrical surface 68 of the cylindrical wall 60 as shown in FIG. 5. The curved mounting plates 66 are drilled and tapped to define a plurality of bolt holes 70 that receive mounting bolts 72 for securing respective wear plates 74 in removable assembly with the outer structure of the rotatable drum 62. A pair of opposed inclined wedge structures 76 and 77 are fixed by welding or by any other suitable means to the cylindrical surface 68 with respective upper portions thereof projecting above the level of the ends of the mounting plate and wear plate. These inclined wedge structures thus protect the leading and trailing end portions of the wear plates 74 and define inclined leading and trailing wedge surfaces 79 and 81 against which the rubber tire material is severely compressed and worked against the steel strand material and against itself so that it is rapidly broken down to its individual constituents and the rubber is pulverized to a desired crumb rubber size range. The wear plates and wedging extremities of the tire working elements 64 will be subjected to severe rubber working forces and will also be subjected to abrasion by the various components of the rubber tire material and by any foreign matter such as dirt, sand, etc. that may be introduced into the machine along with the rubber tire material. Thus, the wedge structures 76 and 77 and the wear plates 74 of the tire working elements are composed of extremely hard and durable material that will resist wear and, when they become worn, the wear plates of the tire working elements can be replaced.

As shown particularly in FIGS. 2 and 3, the tire pulverizing machine 16 also includes an external housing structure which is typically stationary but which may be rotatably mounted in concentric relation with the drum 62 if desired. In fact, the drum 62 may be mounted in stationary manner while the external drumlike, housing 16 may be rotatable in relation therewith. Preferably however the external housing shown generally at 80 is supported in stationary manner while the internal rubber working drum 62 is rotatable therein. The housing 80 of the tire pulverizing machine 16 incorporates a pair of opposed, semi-cylindrical housing sections shown generally at 82 and 84 in FIG. 3 which are pivotally interconnected along the length thereof by means of one or more pivot connections 86 and which are relatively movable in clamshell-like manner by virtue of a yieldable housing connection defined by housing connector plates 88 and 90 which extend along the length of the housing and are coupled along the length thereof by plurality of spring loaded shock absorbers 92. When the force on the opposed housing sections becomes sufficiently great to overcome the retaining force of the springs 94 of the shock absorbers 92, the springs will yield, thereby allowing the housing sections 82 and 84 to separate in clamshell-like fashion thereby minimizing the housing spreading force and protecting the housing and drum from damage. Also, the spring loaded shock absorbers 92 may be released from the housing connection plates 88 and 90, thereby allowing pivotal rotation of the housing sections relative to the housing pivot 86. Typically, the lower housing section is maintained stationary by its support structure while the upper housing section is pivotal in relation therewith when the closing force of the spring loaded shock absorbers 92 is overcome by excessive internal rubber compression force as explained above.

Each of the housing sections 82 and 84 incorporates a generally cylindrical outer wall section 96 and 98 which cooperate to define the basic housing structure of the housing sections 82 and 84. Internally of the cylindrical wall sections 96 and 98 of the housing are mounted a plurality of elongate wedge plate members 100 which are shown in FIG. 3 to be of curved cross-sectional configuration but which may take many other suitable forms without departing from the spirit and scope of the present invention. As shown in FIG. 6 the wedge plates 100 may be provided with wear plates 101 which are secured thereto by retainer bolts 103. The wear plates are composed of hardened wear-resistant material and are replaceable upon becoming worn. The respective outer edge portions 102 and 104 of the elongate wedge plates 100 are releasably connected to the respective cylindrical wall structure 96 or 98 such as by means of bolting or by other suitable means of releasable connection so that they are readily replaceable. Each of the wedge plates cooperates with the housing wall 98 to define an elongate chamber 106 which constitutes a coolant passage through which a coolant medium such as water or air may flow to thus achieve heat transfer from the wedge plates 100 and from the rubber tire material in contact with the wedge plates. The coolant medium may also be a non-combustible liquid or gas to minimize the possibility of explosions as the machine is operated. As shown in FIG. 3 the wedge plates define an inner surface 108 which extends to very close proximity with the respective outer surface portions of the tire working elements 64. It is envisioned that the surfaces 108 of the various elongate wedge plates will have a spacing or clearance at the closest point from the respective tire working elements in the order of from about 0 inch to about ¼ inch. It is not objectionable if the chamber surfaces 108 actually contact the wear plates 74 but these surfaces will typically have a minimal clearance between them. The elongate wedge plates 100 cooperate with the rubber working drum 62 to define a plurality of material wedging chambers 110 having walls which converge from a large dimension at one side which is defined by the maximum spacing of the inner surface 108 of each elongate wedge plate 100 with the outer partially cylindrical surface 75 of the wear plates of the tire working elements 64 to a minimal clearance dimension which is defined by the minimum spacing of the respective inner surface 108 of each of the elongate wedge plates 100 with the partially cylindrical surface 75 of the respective wear plates of the tire working elements. Between the respective maximum and minimum clearance of each of the rubber working chambers 110 the opposed curvature of the surfaces 108 and 75 define a converging or chamber diminishing relationship. The oppositely curved surfaces 108 and 75 cooperate during their relative movement to impart a severe wedging activity to rubber tire material that is present therebetween as the rubber working drum 62 is rotated within the housing thus causing the rubber to be highly compressed and worked against the steel strands that are present in the tire rubber. Further, each of the tire working elements defines rather abrupt inclined end surfaces 79 and 81 as shown in FIG. 3 and as shown in greater detail in FIGS. 5 and 6. These inclined surfaces 79 and 81 are inclined with respect to the curved surfaces 108 of the elongate wedge plates 100 in the range of between about 40° and about 80° and more preferably about 60°. As the rubber working drum 62 is rotated the sharply inclined wedging surfaces 79 and 81 of the tapered wedge structures 76 or 77, depending upon the direction of relative rotation, function to entrap the rubber tire material between the curved surfaces 108 of the elongate wedge plates 100 and the outer cylindrical surface 61 of the cylindrical wall 60 of the drum 62. As the respective wedging surface 76 moves through the minimal clearance area between the wedge plates 100 and the cylindrical surface 61 of the drum it causes rubber tire material to be entrapped and forced into the small converging portion of the rubber processing chamber. When this occurs the inclined surfaces 76 cause the entrapped rubber tire material to be subjected to high compression and essentially rolled or worked back upon its self and worked against the steel strand component of the vehicle tire material. As the rubber tire material is worked upon itself in this manner and subjected to high compression it is also subjected to cutting, tearing and shearing forces by the steel strand constituent of the tires that rapidly break the rubber tire material down into its individual constituents and comminute the rubber tire material to an essentially pulverulent form. As the rubber is continually worked and pulverized it progresses the length of the processing chambers by the force of additional rubber tire material being fed into the inlets of the respective processing chambers. When the rubber tire material has reached the proper degree of pulverization its particulate is discharged from the discharge openings at the downstream ends of the rubber working chambers. In the event that rubber particles discharged are of a dimension exceeding the maximum size limit they will be separated from properly sized particulate by screening or by any other suitable means of classification. The oversized particles will then be reintroduced into the inlet openings of the processing chambers for further working or will be transferred to other pulverization machines for additional processing. Each of the rubber working chambers 110 is of elongate configuration and extends from one end of the drum and housing assembly to the other. The unprocessed rubber tires and rubber tire material is fed into the lead end of the respective rubber working chambers under the force of the auger type conveyer 14 or any other suitable conveyor. The force of the auger type conveyer causes the rubber tire material to progress frown the entry end 112 of the rubber working machine 16 to the discharge end 114 thereof. The length of the rubber working machine 16 is sufficient that upon reaching the discharge end 114 the rubber tire material will have been repeatedly subjected to compression, tearing and shearing as it is repeatedly worked upon its self and worked under high compression against the steel stranding of the tire materials. Thus the rubber tire material is continually reduced in dimension as it traverses the tire working machine from the lead end 112 to the discharge end 114. The rubber tire material then is discharged from the processing chambers of the machine in a pulverulent form that is determined largely by the processing time period at any given rotational speed. This time period is determined by the velocity of rubber movement through the processing chambers which results from the feeding force to which the rubber tire material is subjected during processing. If any portion of the resulting discharged rubber particulate is found to be of excessive dimension, it may be recirculated into the rubber working machine and reprocessed along with newly introduced rubber tire material until its proper dimension is reached or it may be transferred to other machines for additional processing. All rubber particulate that is of a proper dimension may descend through an appropriate classification sieve where it is collected for further handling. Other constituents of the rubber tire materials such as steel strands, polymer fabric etc. is loosened from the rubber particles during processing of the rubber tire material and is thus capable of efficient classification and separation therefrom by any suitable means. The presence of steel strands enhances pulverization of the rubber tire material by cutting, tearing and shredding as the tire material and steel are subjected to high compression and stressing in contact with the counter moving surfaces of the processing chambers. If rubber material to be processed has insufficient metal stranding for efficient processing, steel strand material previously separated from other rubber material may be introduced along with it to achieve a desired rubber/steel mix for efficient pulverization of the rubber. Metal sensors can be employed to detect an inefficient mix and to automatically introduce materials as needed for a desired rubber/steel mix.

As the rubber tire material is worked upon itself in the manner described above by the interrelated counter moving wedging surfaces the material will be subjected to considerable heat build up by virtue of the internal frictional activity that occurs. This heat buildup, while maintained within a proper range, causes efficient separation of the various constituents of the rubber tire material. To ensure that the heat buildup in the rubber tire material remains below the level that would otherwise cause molecular change in the structure thereof, the rubber pulverizing machine will be provided with proper facility for efficient heat transfer from the heated rubber. As the rubber is heated its heat is transferred by contact to the elongate wedge plates 100, to the rubber working elements 64 and to the cylindrical wall structure 60 of the drum 62. As mentioned above, the elongate spaces between the outer cylindrical wall 98 of the housing and the elongate wedging plates 100 define a plurality of elongate heat transfer passages 106. Coolant such as water or any suitable gas, may be circulated through these passages for efficient removal of heat therefrom. If desired, coolant material may also be circulated through the rotatable drum 62 between the drive shaft 34 and the cylindrical wall structure 60 thereof. Heat present in the wall structure 60 will be transferred to the flowing coolant so that it is transported out of the drum and coolant chambers to a suitable facility such as a cooling tower to remove heat and prepare it for muse. To provide a supply of coolant such as water to the various elongate coolant passages 106 a plurality of elongate arcuate plate members 116 are connected to the outer surface of the cylindrical wall 98 such as by welding or by any other suitable means of attachment. Elongate members 116 cook, rate with the outer cylindrical surface of the wall 98 to define a plurality of elongate supply passages 118 which conduct coolant to and from the respective coolant passages 106.

It should be borne in mind that the elongate wedge plates 100 may be replaceably mounted to the cylindrical housing sections 96 and 98 by means of bolting or by any other suitable means of replaceable connection. As the machine is used the wedge plates 100 will be subject to a certain degree of wear. As they become sufficiently worn for replacement they may be simply removed and replaced. Typically the wedge plates 100 will be composed of hardened metal perhaps coated with a wear resistant material such as stellite or carbide. The replaceable elements 74 of the tire working elements 64 may also be composed of a hardened material such as stellate or carbide to thereby provide for extensive service life thereof. Additionally, as shown in FIG. 6, hardened wear plates 101 may be attached to the wedge plates 100 by means of bolts 103 so that the machine can be quickly serviced by wear plate replacement and restored to efficient operation with a minimum of service time.

Although a preferred embodiment of the invention is disclosed in connection with FIGS. 1-5, the invention may conveniently take the form of any of a number of suitable embodiments as are disclosed and described herein in connection with FIGS. 6-9. In alternative embodiment of FIG. 7 a rubber tire pulverizing machine is shown by way of cross-section generally at 124. The machine incorporates a rotatably mounted rubber processing drum shown generally at 126 which incorporates a cylindrical drum 128 which is essentially of the same construction as shown at 62 in FIG. 3. The drum 128 is rotatably driven by a drive shaft 130 and is provided with a plurality of externally mounted tire working members 132 which are of the same general construction as shown in FIGS. 3 and 5 at 64. Externally of the rotatable drum is positioned a plurality of external curved working plates 134 and 135 which are movably supported by pivots 136 and 137 so as to be disposed in movable relation with the drum. These curved plates extend substantially the length of the drum and are disposed in overlapping relation. Respective wedging portions 140 and 141 of the curved elongate working plates 134 and 136 are urged in a direction toward the tire working elements 132 by means of cams 142 and 143 which act on plate stiffeners 145 and 147. Wedge members 144 are employed to transmit rubber compression force from the A plate member 148 is pivoted at 150 which is located on any suitable structural support 151 which may be located on the fixed portion of the tire processing machine or positioned in fixed relation to the machine. The plate 140 extends substantially the length of the drum 128 and having a portion thereof oriented in substantially tangential relation with the drum 128 functioning as a feeding guide for controlled feeding of rubber tire materials into the machine. A portion 153 of the feed plate 148 is curved for diminishing clearance with the outer surfaces of the working members 132. The feed plate 148 is supported externally by the pivot 150 and is thus movable relative to the drum. The terminal end 149 of the feed plate 148 is overlapped by the working plate 135 in the region of the pivotal connection 137 of the working plate 135. The wedge member 144 secures the free extremity of the feed plate 148 in close proximity to the outer surface portions of the working plates of the drum.

As the rubber working drum 128 is rotated in the direction of the rotation arrow by the drive shaft 130, the leading inclined wedge surfaces 152 of the respective rubber working elements 132 develop a wedging action with respective housing sections. The rubber tire that is present at the inclined wedging surfaces 152 will be severely compressed and will be worked upon itself to the extent that it will rapidly break down to a pulverulent form. If the forces between the respective housing sections and the inclined wedging surfaces become excessively severe the force acting internally on the housing sections will yield the overlapping housing plates outwardly away from the wedging surfaces thereby preventing damage to the mechanical structure by excessive forces. The cams 142-143 are adjustable for adjustment of the housing plate sections in relation to the rubber working elements so as to control the spacing between the housing sections and the rubber working elements to thus control the effective dimension of the pulverized rubber. As the rubber tire material traverses the length of the rotatable drum 16 it is repeatedly subjected to severe wedging, tearing and shearing forces by virtue of its being worked against the steel stand material so that it is rapidly broken down to a pulverulent form of powder-like nature that is suitable for the manufacture of other articles.

Figure 8:
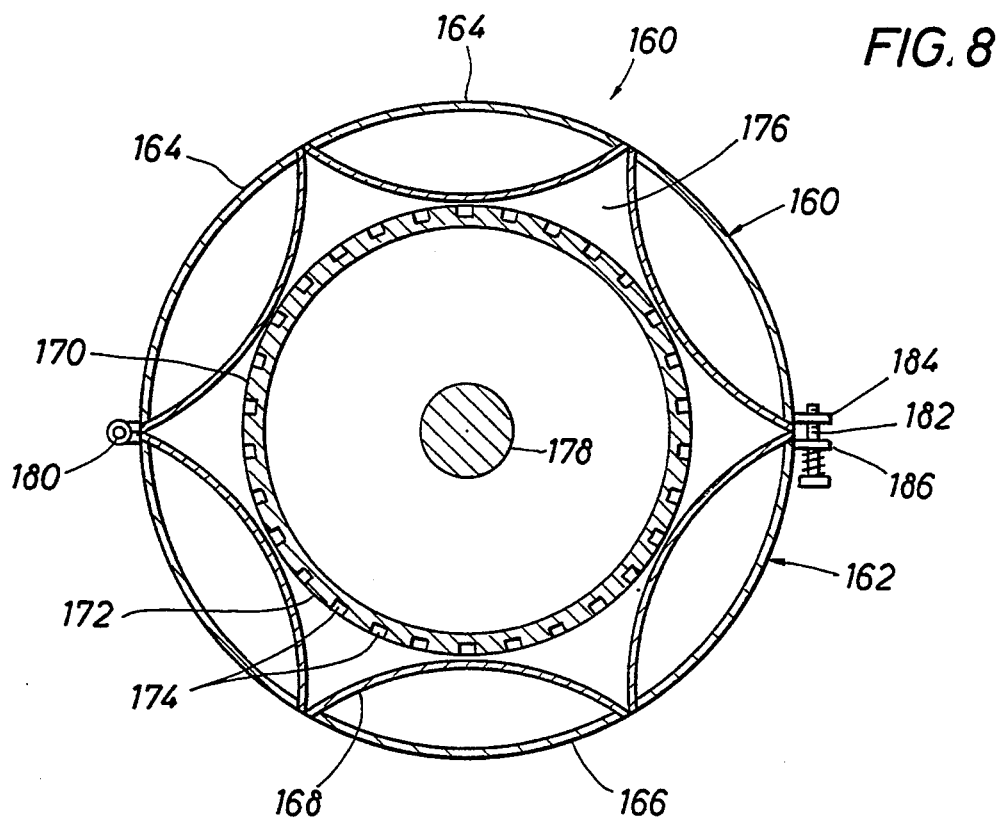
FIG. 8 is a sectional view of a processing machine for rubber fires and rubber tire material representing a further alternative embodiment of this invention.

A further alternative embodiment of the invention is illustrated generally at 160 in FIG. 8 and comprises an outer housing structure shown generally at 162 which is of essentially the same structure and function as shown in FIG. 3. The housing 162 incorporates a pair of outer generally semi-cylindrical housing sections 164 and 166, with a plurality of replaceable elongate curved wedge plates 168 connected thereto and adapted for touching or closely spaced relation of at the central portions thereof with the generally cylindrical outer surface 170 of a rotary drum 172. Externally, the rotary drum 172 defines a plurality of spaced drive depressions or slots 174 which engage and grip the rubber material that is present within the respective rubber working chambers 176. These external drive slots function in tooth-like manner to drive the rubber material against the curved wedging surfaces to thereby cause the rubber tire material to be continuously worked upon itself and worked against the steel strand component of the tire material for development of severe wedging, compression, tearing and shearing forces that quickly reduce the rubber tire material to a pulverulent form. The drum 172 is provided with a centrally oriented drive shaft 178 for power energized rotation of the drum 172. The respective cylindrical housing sections 164 and 166 are coupled in pivotal relation by means of an elongate pivot 180 or a plurality of pivots and are coupled in movable relation by means of a spring loaded shock absorber mechanism 182 which extends in controlling manner through opposed shock absorber plates 184 and 186 in the same manner as discussed above in connection with FIG. 3.

Figure 9:
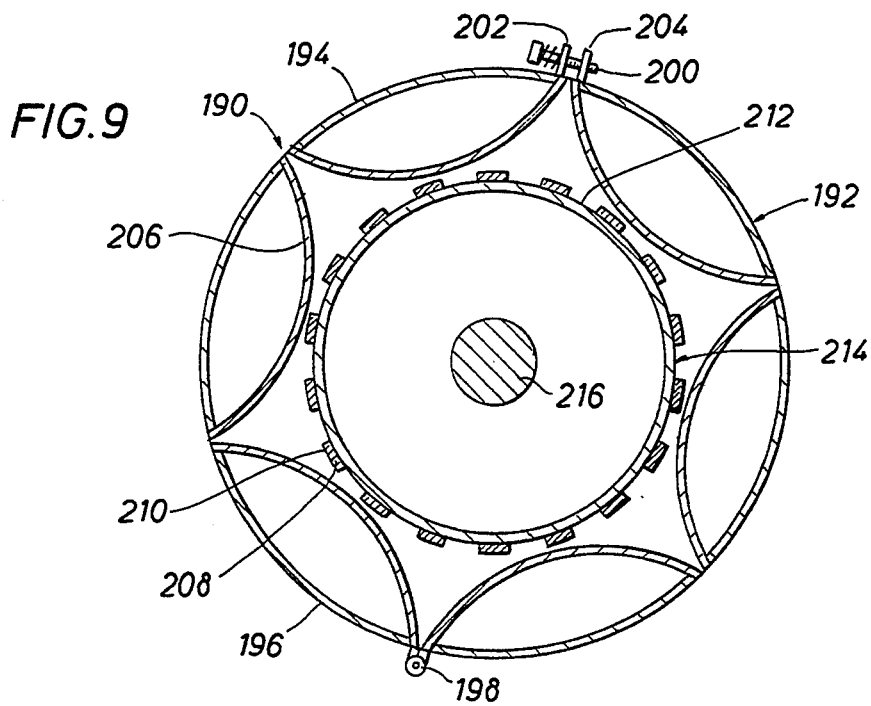
FIG. 9 is also a sectional view illustrating a processing machine for rubber tires and rubber tire materials and representing a further alternative embodiment of this invention.

Another embodiment of the present invention is illustrated in FIG. 9 generally at 190 and incorporates a generally cylindrical housing structure 192 which is defined by relatively movable elongate partially cylindrical housing sections 194 and 196. The housing sections 194 and 196 are maintained in movable assembly by means of a pivot section 198 and a spring loaded shock absorber mechanism 200 which is coupled in spring urged movable fashion to housing control plates 202 and 204. Similar to the housing structure of FIG. 3 the housing 190 includes a plurality of replaceable curved wedging plates 206 having the central portions thereof disposed in close proximity to or in touching relation with the respective outer surfaces 208 of a plurality of outer projections 210 that project radially outwardly from the exterior cylindrical surface 212 of a rotary drum shown generally at 214. The drum 214 is rotated by means of a centrally oriented drive shaft 216 in the same manner as discussed above in connection with FIG. 3.

The outwardly projecting rubber working members 210 define abrupt shoulders for forcing rubber tire material against the respective inner surfaces of the curved wall plates 206. Because of the curvature of the plates 206 the rubber working members induce severe wedging of the rubber material against the respective inner surfaces of the curved wall plates thereby causing the rubber tire material to be continuously worked against itself or upon itself and worked against the steel strand component of the rubber tire material so as to rapidly break it down to its constituents and to break the rubber down to a finely pulverized, powder-like form that is suitable for subsequent use in the manufacture of other articles.

Figure 10:
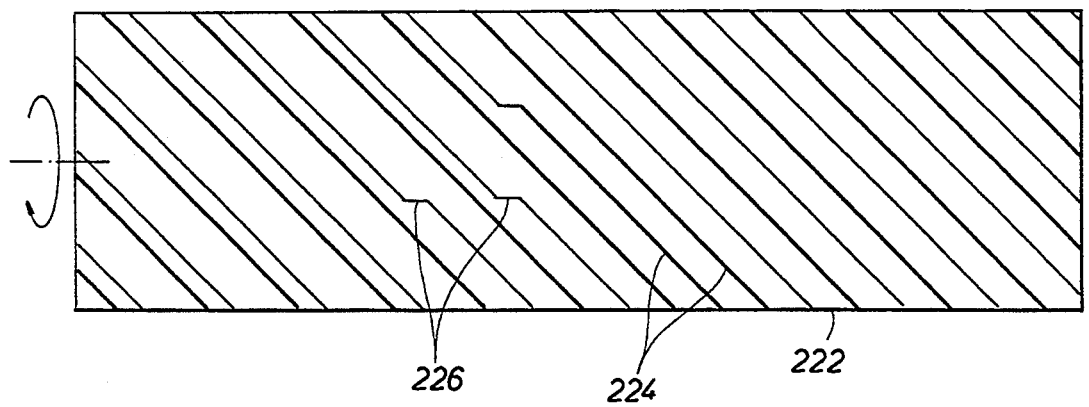
FIG. 10 is a front elevational view of the interior drum portion of a processing machine for rubber fires and rubber tire materials, representing another alternative embodiment of this invention.

Referring now to FIG. 10 a further alternative embodiment of the present invention is shown generally at 220 which incorporates a rotatable drum structure 222 having generally helically oriented walls provided thereon. Additionally, these helically oriented walls may be divided by transverse wall sections 226 so as to achieve inclined wedging surfaces with respect to the direction of material travel. The helically oriented wall structure functions both to achieve conveying of the rubber tire material along the length of the rotatable drum during its processing and to subject the rubber tire material to severe wedging, tearing and shearing forces as it is continually worked against the steel strand material and worked upon itself during rotation of the drum. The drum 220 will be located within a stationary housing similar to that disclosed in connection with FIGS. 3, 8 and 9. Since the rubber material is continuously disintegrated as it traverses the length of the rotating drum it will emerge at the discharge of the rotating drum in a finally pulverized form that is suitable for use in the manufacture of other articles or suitable for use as fuel for various energy related processes.

Figure 7:
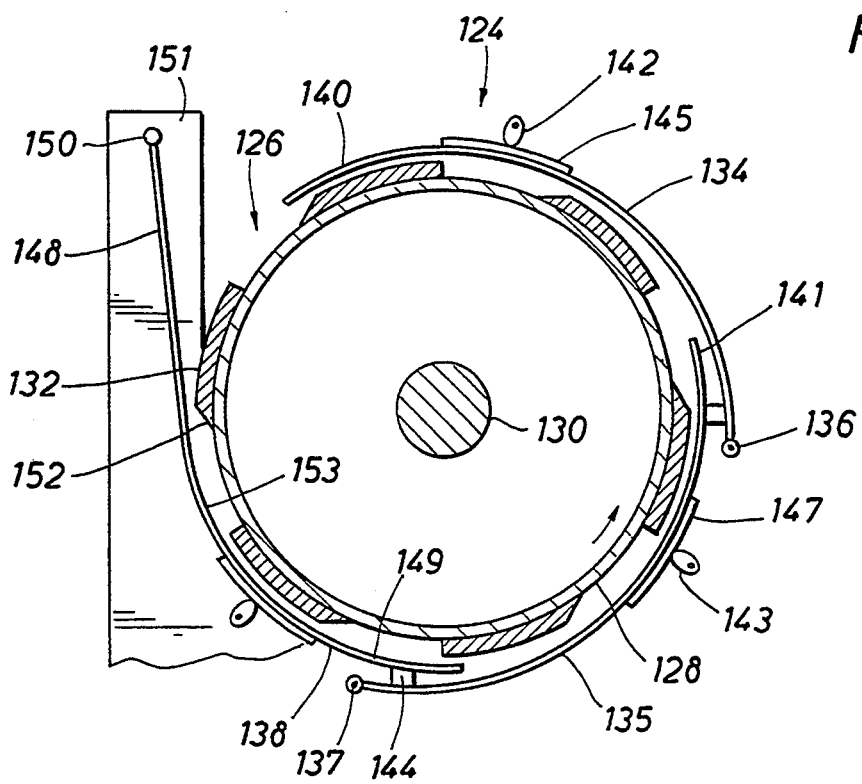
FIG. 7 is a cross-sectional view of a rubber tire and rubber tire material processing machine representing an alternative embodiment of the present invention.
Figure 11:
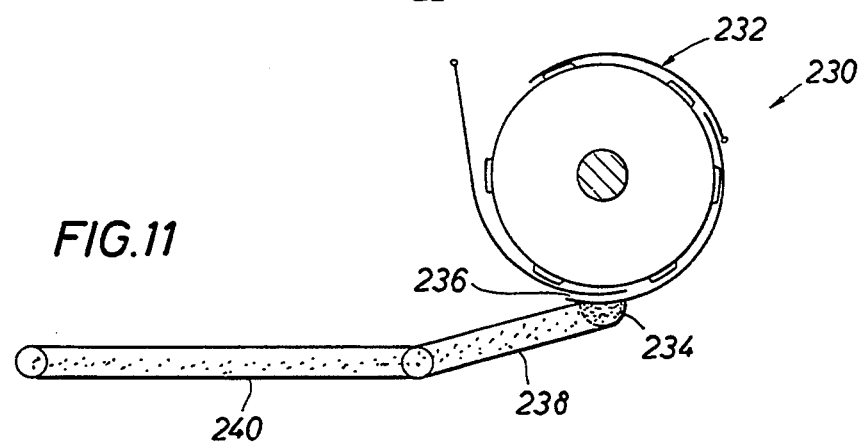
FIG. 11 is a diagrammatic illustration shown partially by way of end view for illustration of a vacuum induced pulverulent rubber classification system for use in conjunction with the rubber tire processing apparatus of FIGS. 1-10.

FIG. 11 refers to a further alternative embodiment of the invention shown generally at 230 wherein a rubber tire processing machine 232 of the same general construction as shown in FIG. 7 is employed for pulverization of rubber tire material. It should be borne in mind that the vacuum transfer system to be discussed as follows may also be employed in conjunction with the apparatus of FIGS. 1–6. When the rubber tire material is being processed the rubber granules are continuously reduced as the rubber particles are repeatedly pressurized and worked against the steel stranding of the tire material. After a suitable period of processing the resulting rubber particulate is discharged. This particulate however may contain a minor percentage of oversize particles which can be readily separated by a suitable classification system such as sizing sieves. The properly sized material can then be conveyed to a facility for subsequent use. The oversize particulate can then be conveyed to one or more additional pulverization machines for further processing as shown by the processing flow arrow 27 of FIG. 1.

A vacuum conduit 234 is shown to be located at the discharge of the pulverization machine 232 and is coupled to a suitable vacuum system such as a vacuum pump. Rubber particulate, after having been reduced in the pulverization machine to a desired size range as determined by one or more sizing sieves 236 at the discharge outlet of the machine will be pulled through the sieve openings and into the vacuum conduit. Thereafter the sized particulate or crumb rubber will be transferred via one or more transfer conduits 238 and 240 to a suitable facility for further handling. The vacuum conduit system may also be employed to conduit sized crumb rubber to additional pulverization machines for further processing.

Since certain changes or modifications may be made in the disclosed embodiment without departing from the inventive concepts involved, it is the aim of the appended claims to cover all such changes and modifications falling within the true spirit and scope of the present invention.

What is claimed is:

1. A method of reducing rubber tire material having a metal constituent to a pulverulent form having a predetermined range of particulate dimension, comprising:

(a) providing a pair of generally cylindrical relatively movable surfaces disposed in radially spaced converging relation and defining at least one rubber tire processing chamber therebetween having an inlet opening into which rubber tire material is fed and a discharge opening from which pulverulent rubber tire material is discharged therebetween for movement of rubber tire material therethrough, said rubber tire processing chamber having a plurality of circumferentially spaced inclined wedge surfaces each defining gradually reducing clearance between said relatively movable surfaces in the direction of rubber tire material movement within said rubber tire processing chamber;

(b) imparting relative movement to said relatively movable surfaces causing movement of said rubber tire material within said processing chamber;

(c) forcing said rubber tire material to move through said processing chamber and through into said gradually reducing clearance defined by said plurality of circumferentially spaced inclined wedge surfaces, during said relative movement of said surfaces during said relative movement, said inclined wedge surfaces applying mechanical compression to said rubber tire material by wedging activity causing said rubber tire material to be worked against said metal constituent thereof and mechanically broken down to a pulverulent form; and (d) discharging pulverulent rubber tire material from said outlet following pulverization of said rubber tire material.

2. The method of claim 1, including:
classifying said pulverulent rubber tire material thus separating said pulverulent rubber tire material into the various constituents thereof.

3. The method of claim 1, wherein one of said relatively movable surfaces is stationary and the other of said surfaces is rotatably movable relative to said stationary surface, said method including:
(a) feeding said rubber tire material into said robber tire processing chamber; and
(b) moving said movable surface rotatably relative to said stationary surface simultaneously with said feeding to cause said forcing of said rubber tire material against said inclined circumferentially spaced wedge surfaces.

4. The method of claim 1, wherein one of said relatively movable surfaces is defined by an elongate stationary generally cylindrical housing and the other of said relatively movable surfaces is defined by an elongate rotatable generally cylindrical member, said method including:
(a) rotating said elongate rotatable generally cylindrical member relative to said stationary generally cylindrical housing to achieve said relative movement of said surfaces; and
(b) feeding said rubber tire material into said rubber processing chamber during rotation of said elongate rotatable generally cylindrical member.

5. Apparatus for reducing rubber tire material having metal stranding to a pulverulent form, comprising:
(a) a generally cylindrical housing;
(b) a generally cylindrical member being located within said generally cylindrical housing and being disposed in radially spaced relation therewith:
(c) said generally cylindrical housing and generally cylindrical member defining a pair of relatively longitudinally movable surfaces being disposed in diverging relation and cooperatively defining at least one elongate rubber tire material processing chamber having first and second ends, said first end defining an inlet opening and said second end defining discharge opening;
(d) at least one wedge plate being located within said generally cylindrical housing and cooperating with said generally cylindrical member to define a processing chamber therebetween said wedge plates cooperatively defining said inlet opening and said discharge opening:
(e) a wedging surface being defined by at least one of said relatively longitudinally movable surfaces and being oriented in inclined relation with the opposite one of said relatively longitudinally movable surfaces, upon relative movement of said wedging surface and said other relatively movable surface rubber tire material present between said wedging surface and said other relatively longitudinally movable surface being subjected to mechanical compression and internal shear forces anti being worked against said metal stranding to break down said rubber tire material to a pulverulent form for discharge from said material processing chamber through said discharge opening;
(f) means for feeding rubber tire material into said processing chamber; and
(g) means for receiving pulverulent rubber tire material from said discharge opening.

6. The apparatus of claim 5, wherein said relatively longitudinally movable surfaces are each of generally curved configuration.

7. The apparatus of claim 5, wherein said wedging surface has a range of inclination relative to said other relatively longitudinally movable surface in the order of from about 35 degrees to about 80 degrees.

8. The apparatus of claim 5, wherein:
(a) said generally cylindrical housing defining one of said relatively movable surfaces; and
(b) said generally cylindrical member defining the other of said relatively movable surfaces, said generally cylindrical member being supported for rotation within said generally cylindrical housing.

9. The apparatus of claim 8, wherein:
one of said generally cylindrical housing and said generally longitudinal drum being rotatably mounted and being rotatable relative to the other of said generally cylindrical housing and generally, cylindrical member to thus cause said relative longitudinal movement of said surfaces thereof.

10. The apparatus of claim 5, wherein:
one of said generally cylindrical housing and said generally cylindrical drum defines a plurality of elongate plates each having a transverse generally curved configuration and having a portion thereof being disposed in closely spaced relation with said other of said relatively movable surfaces and defining said discharge opening.

11. The apparatus of claim 5, wherein:
(a) said generally cylindrical housing includes an outer wall structure; and
(b) said plurality of elongate plates also cooperating with said outer wall structure to define a plurality of elongate coolant transfer passages for conducting coolant flow therethrough for heat transfer from said rubber tire material through said elongate plates.

12. The apparatus of claim 5, wherein:
(a) said cylindrical housing being non-rotatable;
(b) said generally cylindrical member being mounted for rotation within said generally cylindrical housing and having a plurality of rubber working elements externally thereof and disposed for movement in close proximity with said curved elongate plates of said generally cylindrical housing, said rubber working elements cooperating with said curved elongate plates to define a plurality of rubber working chambers each having inlet openings for receiving rubber tire material and having discharge openings for discharge of pulverulent rubber tire material and other rubber tire material from said rubber working chambers.

13. Apparatus for processing rubber tires and rubber tire materials to yield rubber tire material of pulverulent character, comprising:
   (a) an elongate generally cylindrical non-rotatable housing;
   (b) at least one elongate tire rubber working member being disposed within said elongate generally cylindrical non-rotatable housing and having a wedging portion thereof located radially inwardly of said generally cylindrical non-rotatable housing;
   (c) a generally cylindrical tire rubber processing element being mounted for rotation within said elongate generally cylindrical non-rotatable housing and cooperating with said wedging portion to define a tire rubber processing chamber having an inlet opening for receiving rubber tire material and a discharge opening through which pulverulent rubber tire material is discharged, said tire rubber processing chamber extending lengthwise of said tire rubber tire processing element and having an inlet opening at one end thereof and a discharge outlet opening at the other end thereof;
   (d) at least one inclined rubber processing surface being defined externally of said tire rubber processing element and having an inclined wedging relationship with said wedging portion during rotation of said tire rubber processing drum within said elongate generally cylindrical non-rotatable housing; and
   (e) means for feeding rubber tires and rubber tire materials into said tire rubber processing chamber and receiving pulverulent rubber tire material therefrom.

14. The apparatus of claim 13, wherein:
   (a) said at least one tire rubber working member being a plurality of elongate tire rubber working members each being supported within said elongate generally cylindrical non-rotatable housing and each defining wedging portions; and
   (b) said rubber inclined processing surface being defined by a plurality of tire rubber working elements located externally of said tire rubber processing element and being disposed for rotary movement in close proximity with said wedging portions of said tire rubber working members, said tire rubber working elements each defining an abrupt inclined wedging surface at the lead portion thereof for wedging engagement with tire rubber material present within the respective rubber processing chamber.

15. The apparatus of claim 13, wherein:
   (a) said elongate generally cylindrical non-rotatable housing being defined by opposed relatively movable housing sections; and
   (b) means yieldably securing said housing sections in assembly and yielding responsive to predetermined internal forces against said housing sections to permit sufficient lateral opening of said housing to dissipate internal forces that might damage said housing or said generally cylindrical tire rubber processing element.

* * * * *